United States Patent [19]

Sanchez et al.

[11] Patent Number: 5,367,521
[45] Date of Patent: Nov. 22, 1994

[54] TELECOMMUNICATIONS PACKET SWITCHING SYSTEM

[75] Inventors: Francisco G. Sanchez; Pedro L. Martin; Juan D. Solis; Bernardo E. Allen; Juan J. Blanco, all of Madrid, Spain

[73] Assignee: Telefonica de Espana, S.A., Madrid, Spain

[21] Appl. No.: 152,878

[22] Filed: Nov. 16, 1993

Related U.S. Application Data

[63] Continuation of Ser. No. 788,147, Nov. 5, 1991, abandoned.

[30] Foreign Application Priority Data

Nov. 5, 1990 [ES] Spain ................................ 9002803

[51] Int. Cl.$^5$ ............................................. H04L 12/56
[52] U.S. Cl. ................................. 370/60; 370/16; 370/58.1; 370/58.2; 370/94.1
[58] Field of Search ................. 370/16, 58.1, 58.2, 370/60, 94.1

[56] References Cited

U.S. PATENT DOCUMENTS

| | | | |
|---|---|---|---|
| H586 | 2/1989 | Kun | 370/94.1 |
| 4,763,247 | 8/1988 | Borovski et al. | 370/60 X |
| 4,885,739 | 12/1989 | Read et al. | 370/58.1 |
| 4,903,263 | 2/1990 | Patel et al. | 370/110.1 |
| 4,958,341 | 9/1990 | Hemmady et al. | 370/60.1 |
| 4,970,723 | 11/1990 | Lin | 370/110.1 |
| 4,993,017 | 2/1991 | Bachinger et al. | 370/60 X |

*Primary Examiner*—Douglas W. Olms
*Assistant Examiner*—Russell Blum
*Attorney, Agent, or Firm*—Popham, Haik, Schnobrich & Kaufman, Ltd.

[57] ABSTRACT

The present invention provides a telecommunications packet switching system including a hardware portion and a software portion forming an advanced multiprocessing, multiprocessor system (including multiple processors, capable of running more than one process at a time). The hardware and software structures are fully distributed and fault-tolerant, providing a flexible configuration and remote management through the network itself, managing the switching and transmission of messages split into packets, including use of different specific protocols. The system can be connected to a variety of different networks, allowing a large concentration of low speed lines. A control station executes operational functions, and a terminal allows interaction with the system. A DC/DC converter is provided at each element in the processing unit.

5 Claims, 12 Drawing Sheets

TELECOMMUNICATIONS PACKET SWITCHING SYSTEM

This application is a continuation of U.S. patent application Ser. No. 07/788,147, filed Nov. 5, 1991, now abandoned.

BACKGROUND OF THE INVENTION

1. Field of the Invention

The present invention relates to telecommunications. More specifically, the invention relates to telecommunications packet switching systems.

2. Related Art

Various packet switching systems are known in the art, which carry out switching of data packets between an origin and a destination. Disadvantageously, known packet switching systems do not incorporate different types of modems existing in the market, such as integrated (on-board) modems. Similarly, it is desirable that known electronic switching systems have larger packet switching capacity, and also data line connections with improved service quality.

Accordingly, there is a need to provide packet switching systems so that the cost of networks implemented with improved packet switching systems, and the cost of configuring each line, would be reduced. Also, an improved packet switching system would allow higher speed data interfaces to be included, the interfaces having the capacity to support a large variety of types of physical interfaces. Finally, it is envisioned that an improved system would have a definition and implementation of physical levels of data interfaces for connecting to digital transmission networks.

Despite these needs, existing telecommunications packet switching systems do not possess the desirable features pointed out above.

SUMMARY OF THE INVENTION

The telecommunications packet switching system according to the present invention is an efficient solution to the problem of increasing capacity over known telecommunications packet switching systems, providing both increased packet switching capacity and an increased number of line connections. It also improves service quality, cost operation of the data network, speed, definition of data interfaces, flexibility to adapt to different data networks, and implementation of new service and facilities.

The present invention provides a telecommunications packet switching system including a hardware portion and a software portion forming an advanced multiprocessing, multiprocessor system (including multiple processors, capable of running more than one process at a time). The hardware and software structures are fully distributed and fault-tolerant, providing a flexible configuration and remote management through the network itself, managing the switching and transmission of messages split into packets, including use of different specific protocols. The system can be connected to a variety of different networks, allowing a large concentration of low speed lines. A control station executes operational functions, and a terminal allows interaction with the system. A DC/DC converter is provided at each element in the processing unit.

BRIEF DESCRIPTION OF THE DRAWINGS

The invention is better understood by reading the following Detailed Description of the Preferred Embodiments with reference to the illustrative and non-limiting drawing figures, in which like reference numerals refer to like elements throughout, and in which:

FIGS. 13–20 show structures and components of the system in greater detail than in previous drawings. In particular:

DETAILED DESCRIPTION OF THE PREFERRED EMBODIMENTS

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

The preferred telecommunications packet switching system is an advanced generation system, one with multiple processors, each capable of processing multiple tasks, with a fully distributed hardware and software structure. The telecommunications packet switching system is fault-tolerant, being flexibly configurable and remotely manageable through the network itself.

Figure 1:
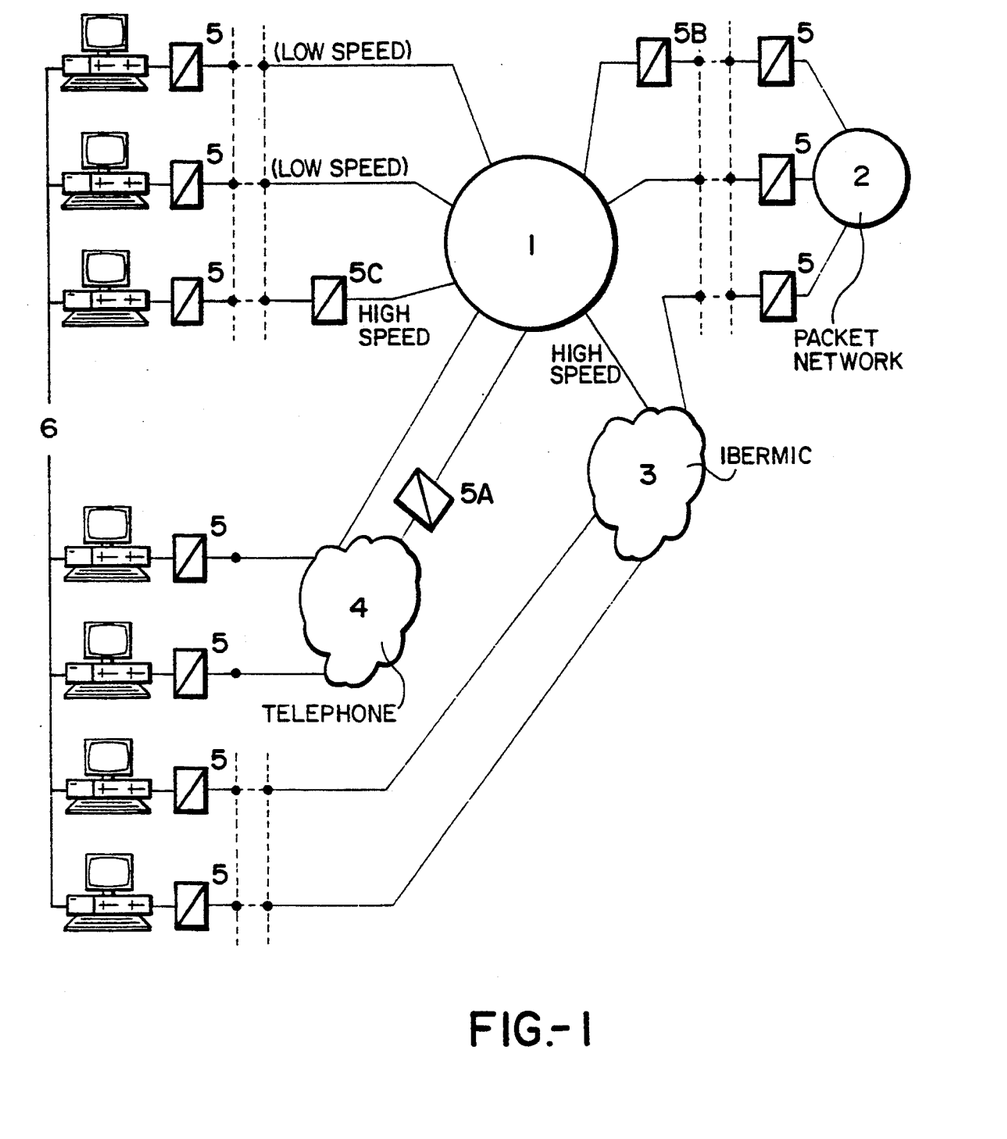
FIG. 1 shows diagrammatically a view of how the present system may be connected with several types of existing networks.

As can be seen in FIG. 1, the present system, designated by reference numeral 1, permits connection to various types of networks. For example, the present system 1 may be connected to a switched telephone network 4, either directly or through modems such as modem 5A. Likewise, the system 1 may be connected to an IBERMIC network 3, either directly or by means of high speed (up to 2 Mbps) or very high speed communication paths. Moreover, the system 1 may be connected to other packet switching networks 2, by dedicated lines or modems 5B. Also, the system's network station 7 (FIG. 2) allows direct connection with subscriber terminals 6 via dedicated lines and modems 5C. Finally, the present invention's flexible network station allows connection to other types of networks which may arise in the future.

Figure 9:
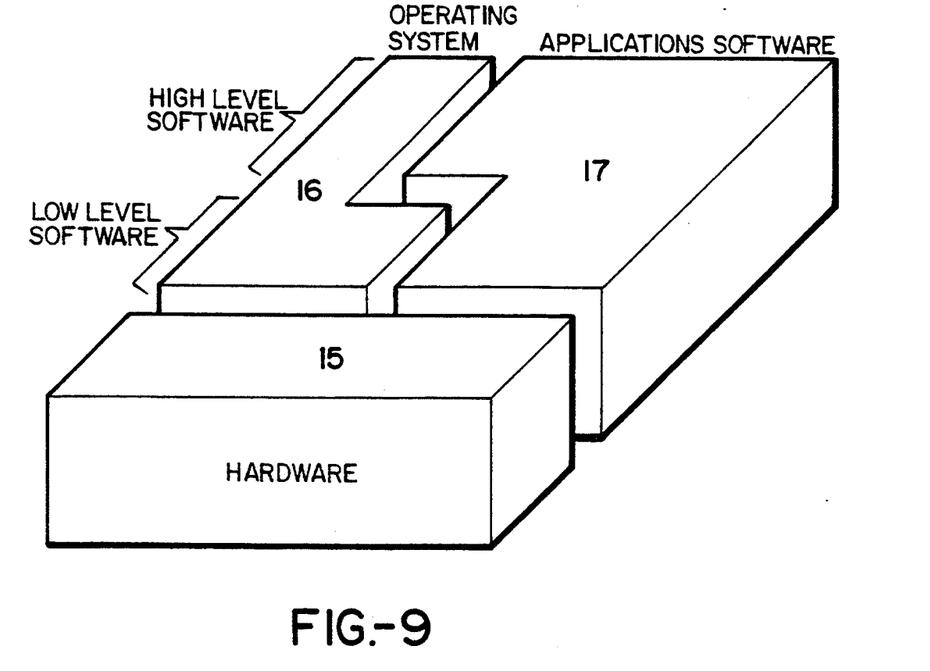
FIG. 9 schematically illustrates the ratio between hardware and software.

Referring especially to FIG. 9, the preferred embodiment of the telecommunications packet switching system according to the present invention includes a hardware portion 15 and a software portion collectively indicated by reference numerals 16 and 17.

Figure 2:
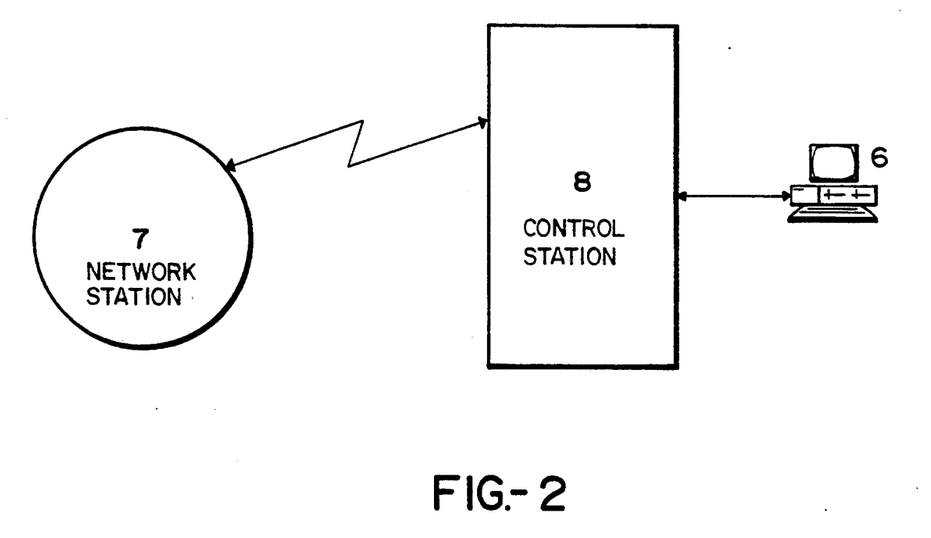
FIG. 2 is a high level block diagram showing main portions of the system.

Referring more specifically to FIG. 2, the hardware portion 15 includes a network station 7 and a control station 8 connected to one or more operation terminals, one of which is shown schematically as element 6. The network station 7 carries out the packet switching function, allowing a large concentration of low speed lines (up to 9600 bps).

Figure 3:
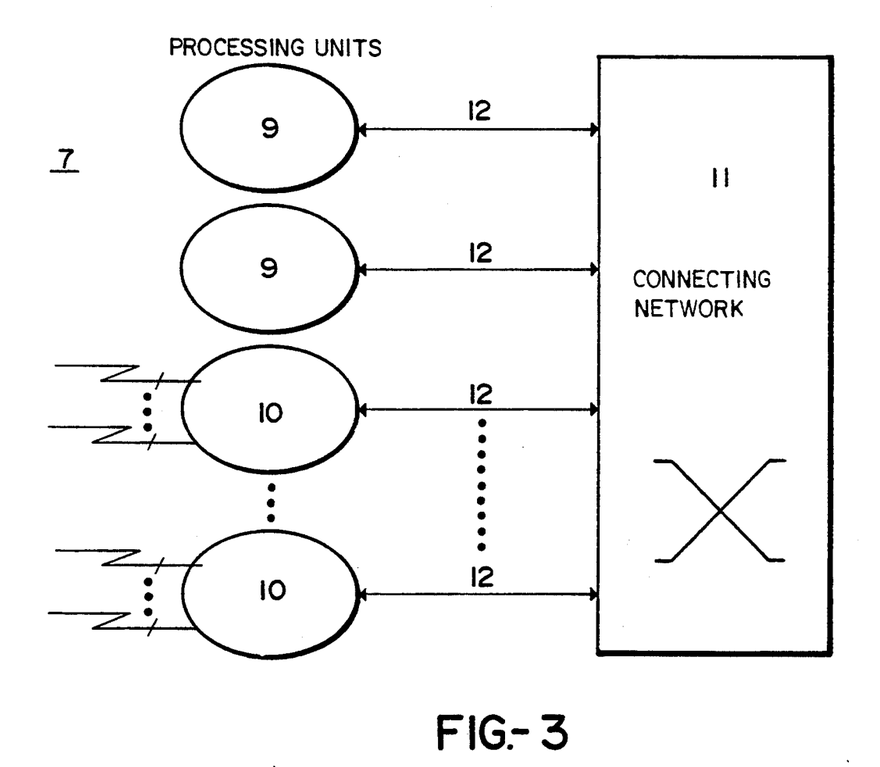
FIG. 3 shows a FIG. 2 network station 7 in greater detail.

FIG. 3 shows the network station 7, including three components: processing units 9 and 10, a connecting unit 11, and a local interconnection highway 12. The preferred interconnection highway 12 is a serial bus including a clock distribution signal part, as well as data transmission parts for transmitting data between the processing units 9, 10 and the connecting unit 11.

Figure 4:
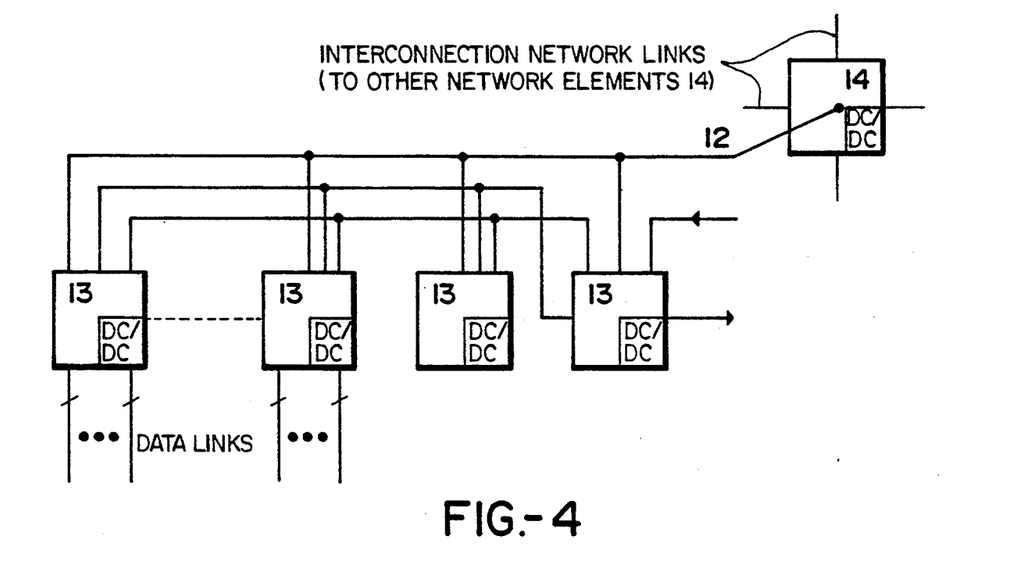
FIG. 4 shows the FIG. 3 processing units 9, 10 in greater detail.
Figure 7:
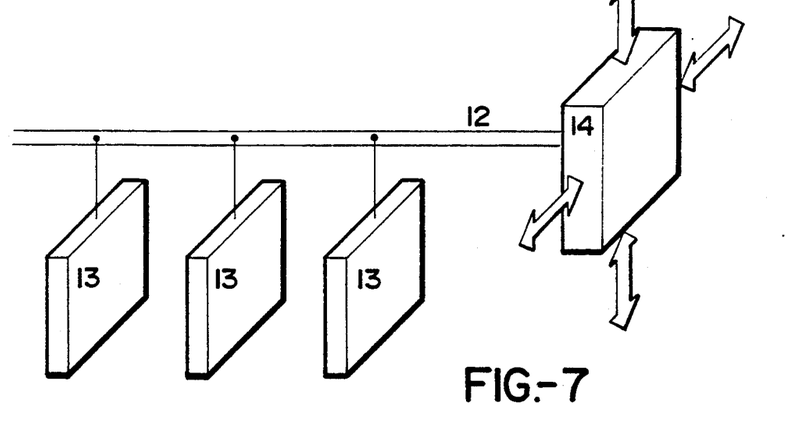

As shown in FIGS. 4 and 7, the FIG. 3 processing units include a set of elements 13 which are interconnected to each other and to a network element 14 through the local interconnection highway 12. Communication among the different elements 13 of the processing units 9, 10, as well as communication between the elements 13 and those of other processing units, is provided by interconnection highway The present telecommunications packet switching system provides three types of processing units 9, 10 differing from each other by the functions they perform. A first type of processing unit (designated 10 in FIG. 3) serves as a packet switching unit, serving external data lines. A second type of processing unit (designated 9 in FIG. 3) serves as a control and supervision unit, executing central control functions for the system, such as communication with the control station 8 (FIG. 2) for various operational functions. A third type of processing unit serves as a switching and control unit, executing packet switching and central control functions for the system. The processing units serve to reduce the number of lines required by the system.

Figure 5:
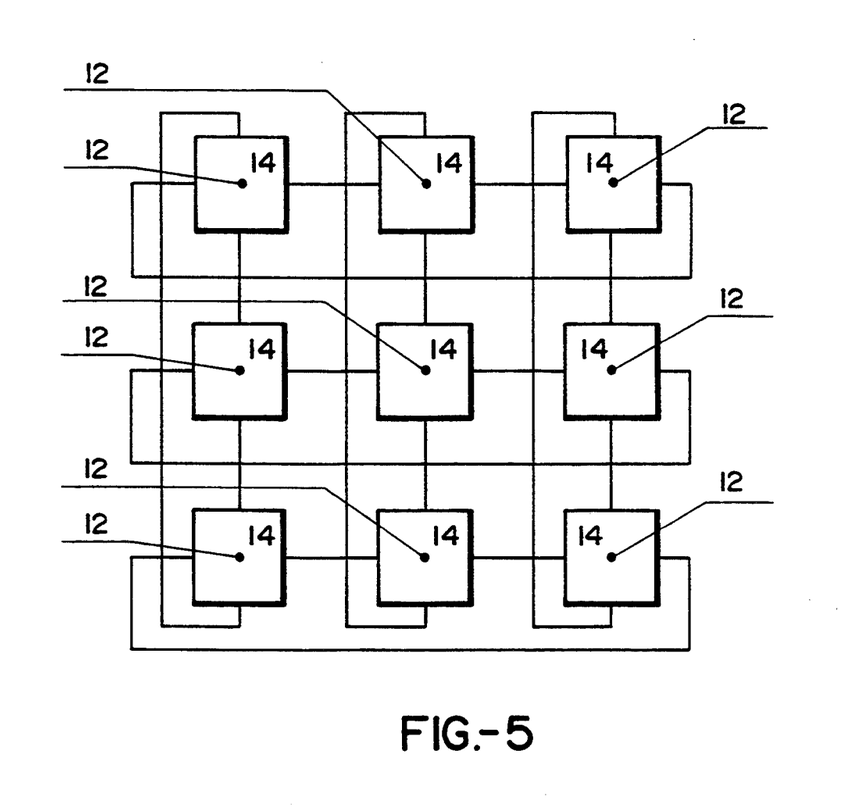
FIGS. 5, 6, and 7 show embodiments of the FIG. 3 connecting network in greater detail.
Figure 6:
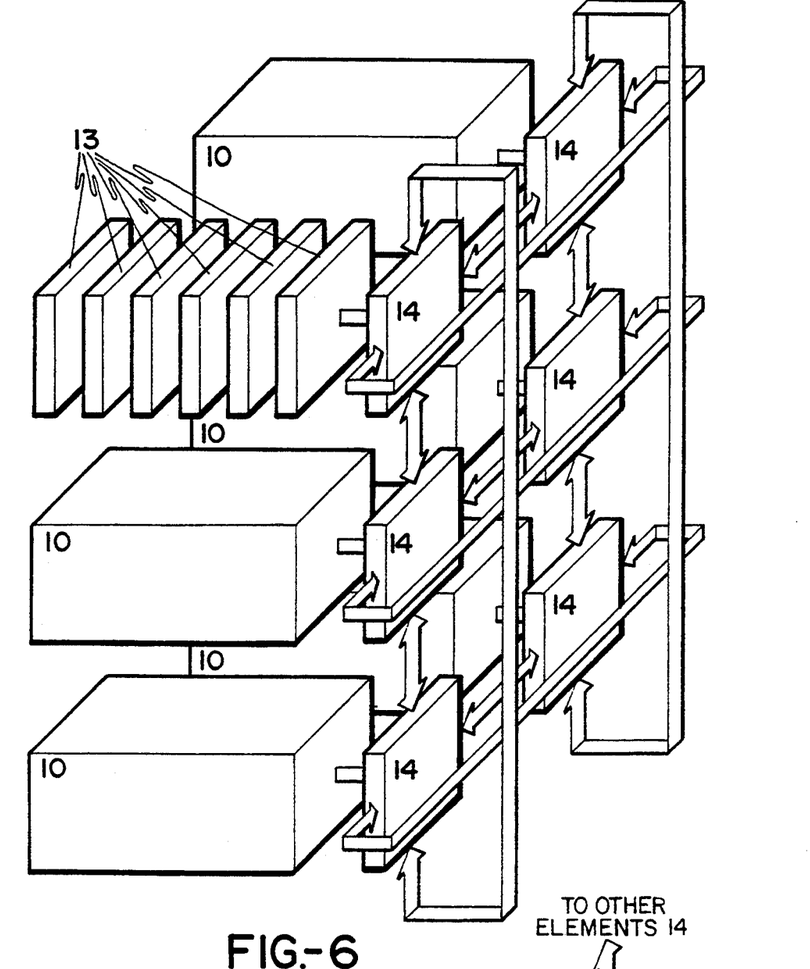
Figure 8:
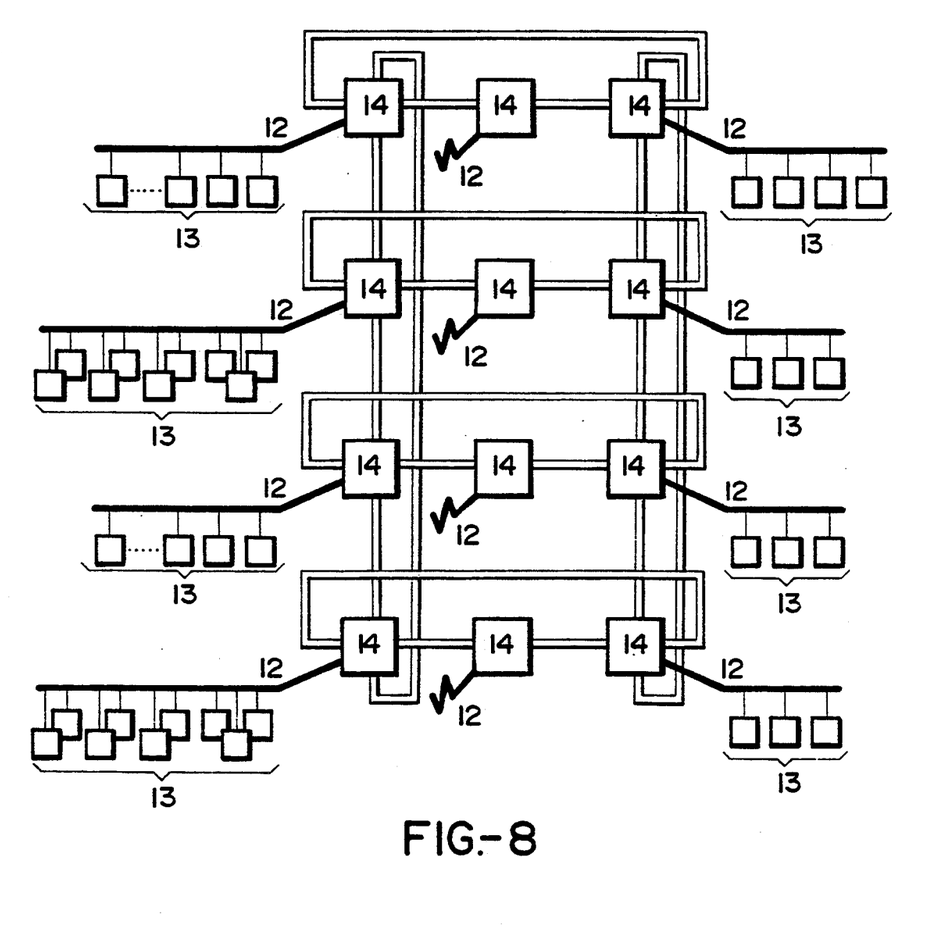
FIG. 8 shows the FIG. 3 processing units 9, 10 in greater detail.

As shown in FIGS. 5, 6, and 8, the connecting network may include any number of network elements 14, all being interconnected through local interconnection highways 12. They may be connected either directly or through other network elements, forming a flat array, facilitating expansion of the network and providing alternate paths between the network elements.

The control station 8 (FIG. 2) includes one or more computers, based on required capacity, necessary peripherals (such as console or data storage devices), guaranteeing software portability. The control station 8 performs the operational functions, the control station 8 performing control and processing of information related to management and maintenance of the system 1 (FIG. 1) as a whole.

The operation terminals 6 (FIG. 2) are preferably computers having resident processing capacity, and include color screens enabling graphic visualization of system operation, and other peripherals such as a mouse, all for making the system run more efficiently. The operation terminals 6 may be either local or remote to the control station 8, via the network station 7.

Figure 11:
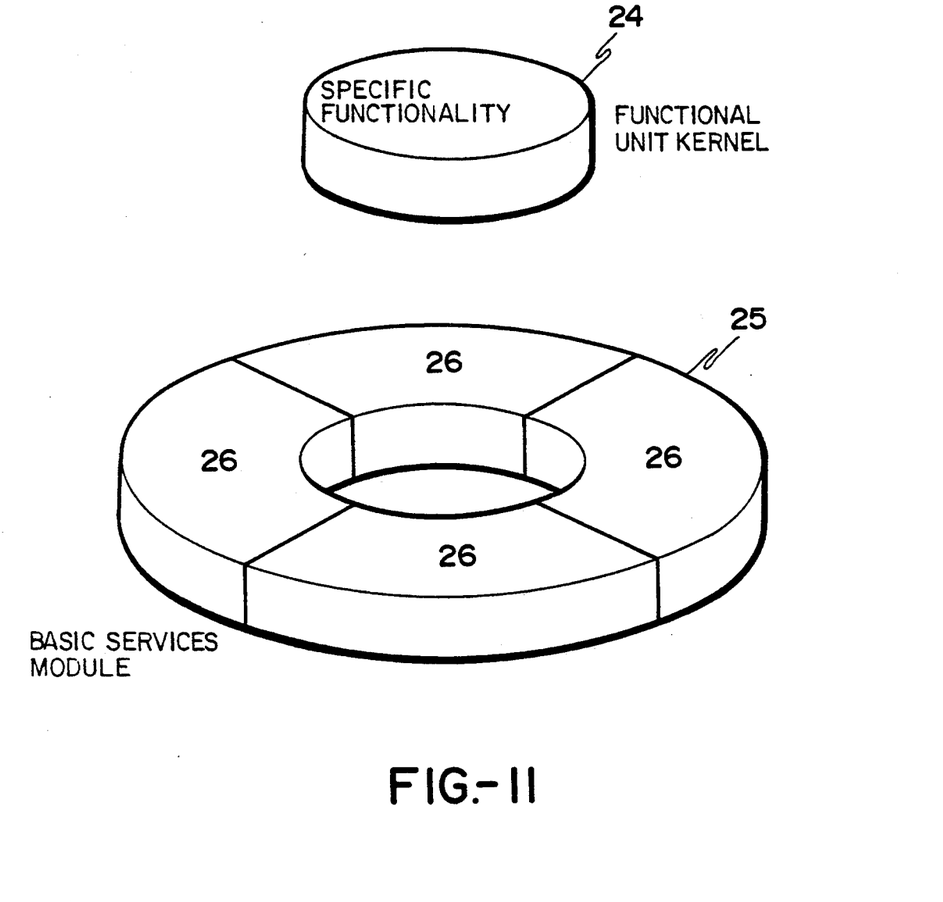
FIG. 11 schematically illustrates the structure of the operational software.

System software implements the functions of basic software (indicated by reference numeral 16, FIG. 9), applications software 17 (FIG. 9), and the operational software (FIG. 11).

The FIG. 9 basic software 16 provides the application software 17 with a virtual machine environment, isolating application software 17 from the hardware 15 as much as possible. In other words, from the point of view of the application software 17, the system 1 appears to be only a fault-tolerant processor with unlimited memory, unlimited processing capacity, and so forth.

The FIG. 9 application software 17 implements specific tasks of the functions of the system 1 as a whole. For example, application software 19 implements packet switching, communication protocols, other operational functions, and so forth.

The operational software shown schematically in FIG. 11 supervises and manages the overall system 1 and the networks related thereto, and performs several functions. The operational software provides communication between applications programs, independent of their relative physical location. It also measures communications traffic and monitors service quality. It manages data of the operation network. It establishes and releases virtual "circuits" in the virtual machine. It establishes and releases services for communicating between resident applications of different equipment in the system. It transforms data so that functions performed in different equipment may be performed independently.

Speaking in terms of logical abstraction, the system software includes resources grouped in layers, in which the operating capacity of the components of each layer is defined by its interface with the upper layer, through which it accedes to the resources that the lower layer elaborates and presents. The system software has two layers, a low level layer and a high level layer, as shown in FIG. 11. More generally, a "layer" may be defined as a group of separate code files of the same "level" as understood in the art of "top-bottom" software design.

The low level software elaborates the services (resources) used by the high level software, using the physical resources offered by the hardware shown in FIG. 2. At the same time, the low level software offers the high level software the services of communicating between high level components, providing access to processors for executing high level programs, and providing access to peripheral devices.

Figure 10:
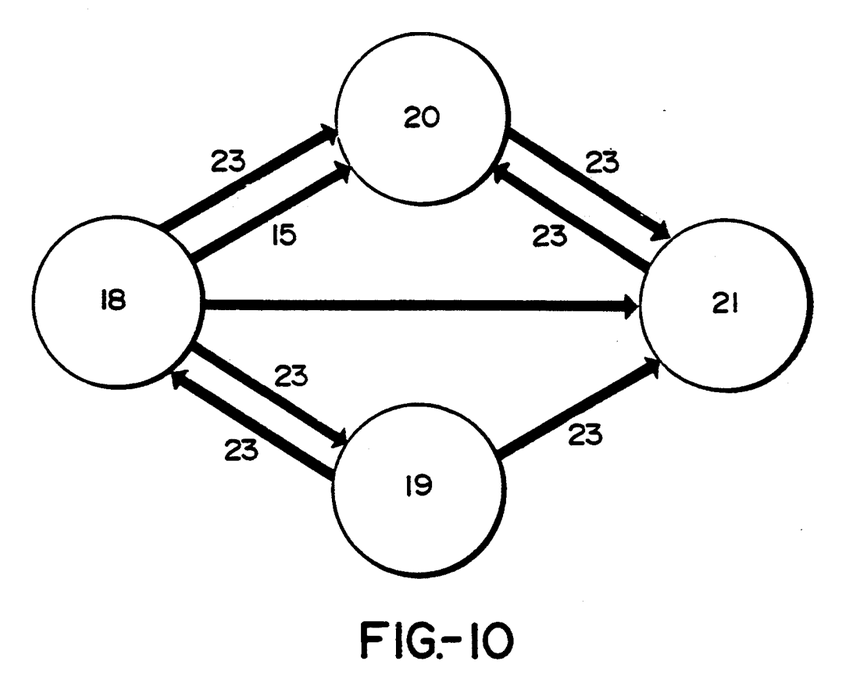
FIG. 10 schematically illustrates high level software processing.

As shown in FIG. 10, the high level software is implemented as only one type of component, and includes processes 18, 19, 20, 21, each of which is an elementary unit of implementation. The creation of processes 20 and 21 is dynamic in nature, the processes 20 and 21 being created when needed and destroyed when they are no longer necessary. Communication between processes is executed by means of messages which allow exchange of data independent of the processor in which the data are executed. Some of these messages involve creation of processes, while others (23) involve interaction messages between processes.

The operational software is developed on the concept of a "functional unit", each functional unit being a software entity that, in its entirety, provides all the functionality of the system shown in FIG. 11. Each functional unit has a specific task that sometimes coincides with a system function and other times group as more that one function. This breakdown into functional units allows independent functions to have little coupling to each other, in either their implementation or their operation, thus offering advantages of flexibility, uniformity in applied design methodology throughout the system, and software implementation.

As shown in FIG. 11, each functional unit has a basic service module 25 which includes a set of facilities and services 26 which are common to all of them. The functional unit also has a functional unit core 24 which is different in each case, providing the functional unit with it specific function.

Figure 12:
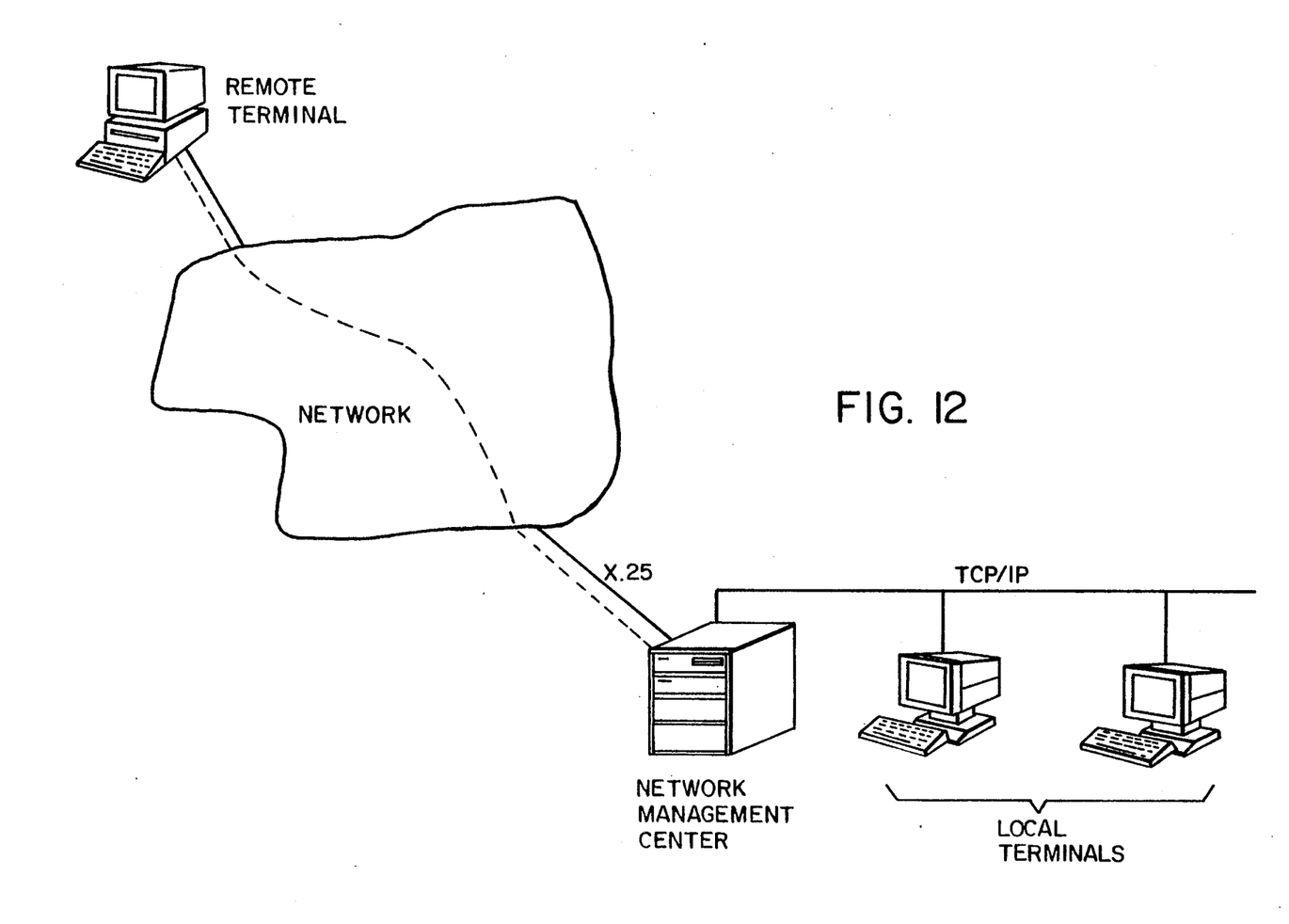
FIG. 12 schematically illustrates connection of the local and remote terminals to the network.

FIG. 12 schematically illustrates connection of the local and remote terminals to the network.

Figure 13:
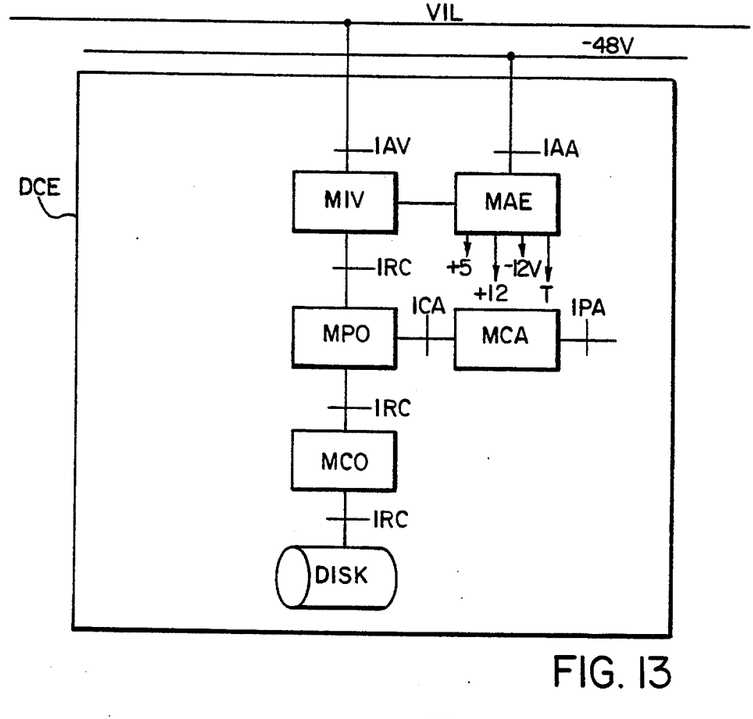
FIG. 13 illustrates a disk controller element (DCE).

FIGS. 13–20 show structures and components of the system in greater detail than in previous drawings. In particular:

FIG. 13 illustrates a disk controller element (DCE).

Figure 14:
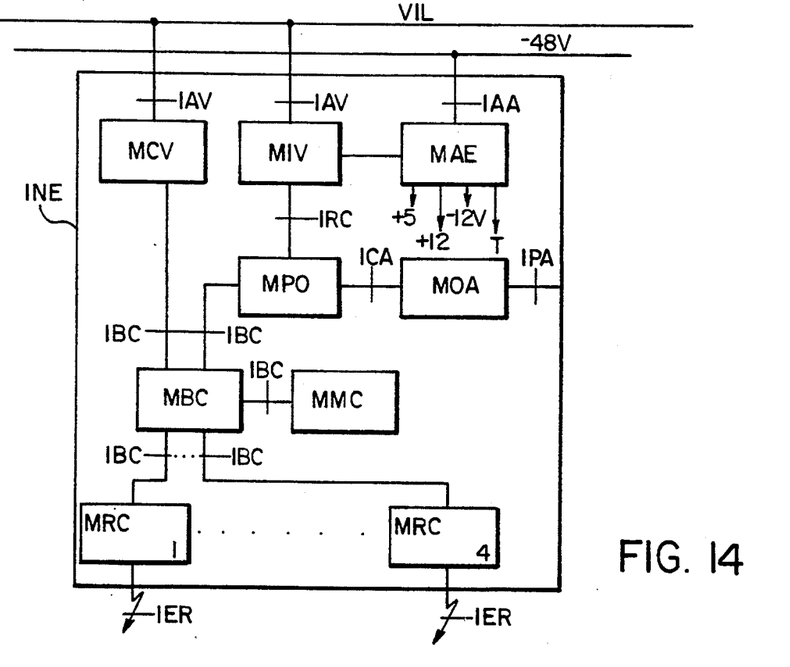
FIG. 14 illustrates an interconnection network element (INE).

FIG. 14 illustrates an interconnection network element (INE).

Figure 15:
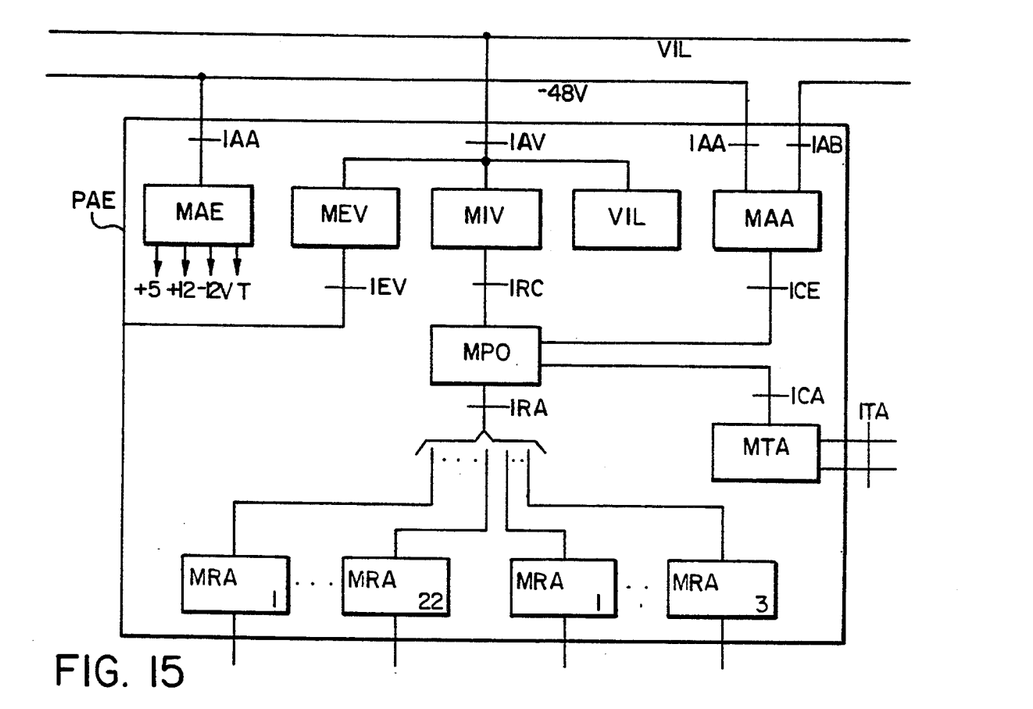
FIG. 15 illustrates a power supply and alarm element (PAE).

FIG. 15 illustrates a power supply and alarm element (PAE).

Figure 16:
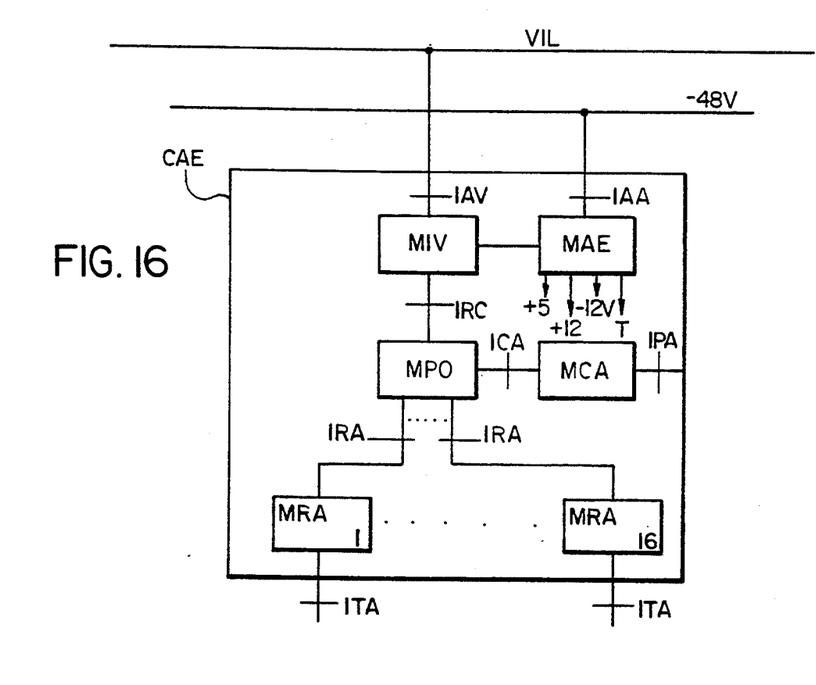
FIG. 16 illustrates a clock and alarm element (CAE).

FIG. 16 illustrates a clock and alarm element (CAE).

Figure 17:
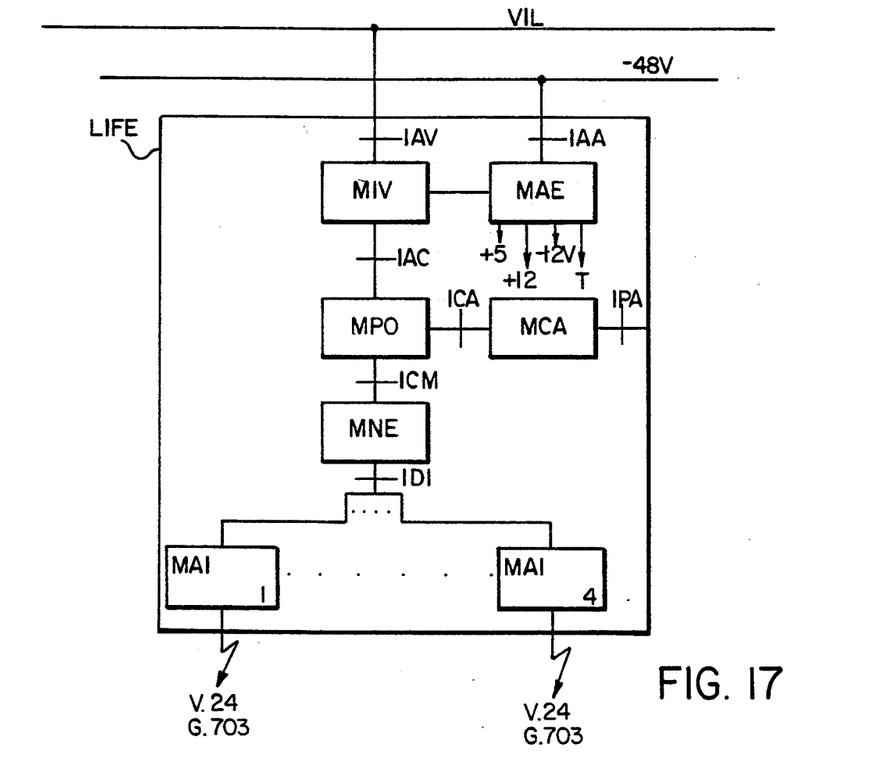
FIG. 17 illustrates a line interface unit (LIFE).

FIG. 17 illustrates a line interface unit (LIFE).

Figure 18:
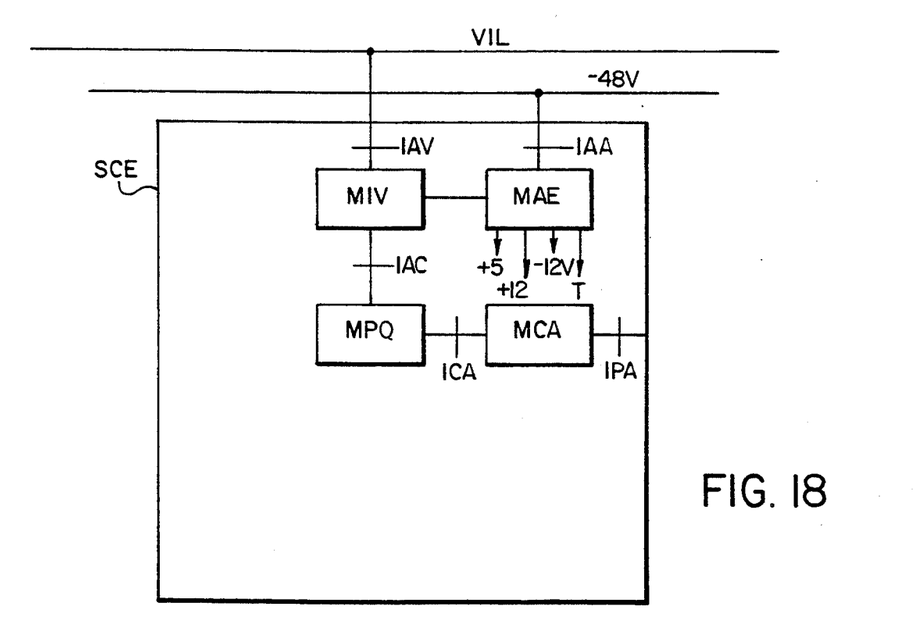
FIG. 18 illustrates a supervision and control element (SCE).

FIG. 18 illustrates a supervision and control element (SCE).

Figure 19:
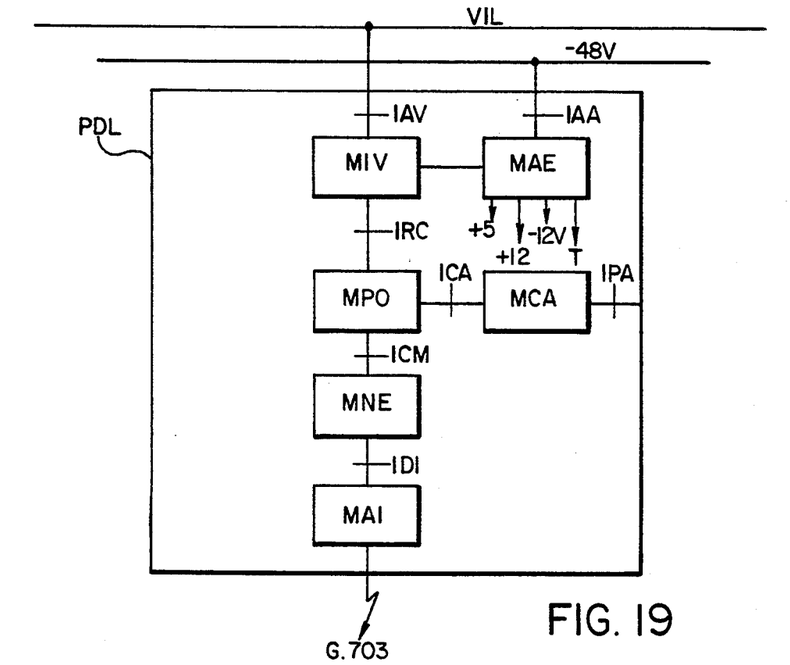
FIG. 19 illustrates a primary digital link (PDL).

FIG. 19 illustrates a primary digital link (PDL).

Figure 20:
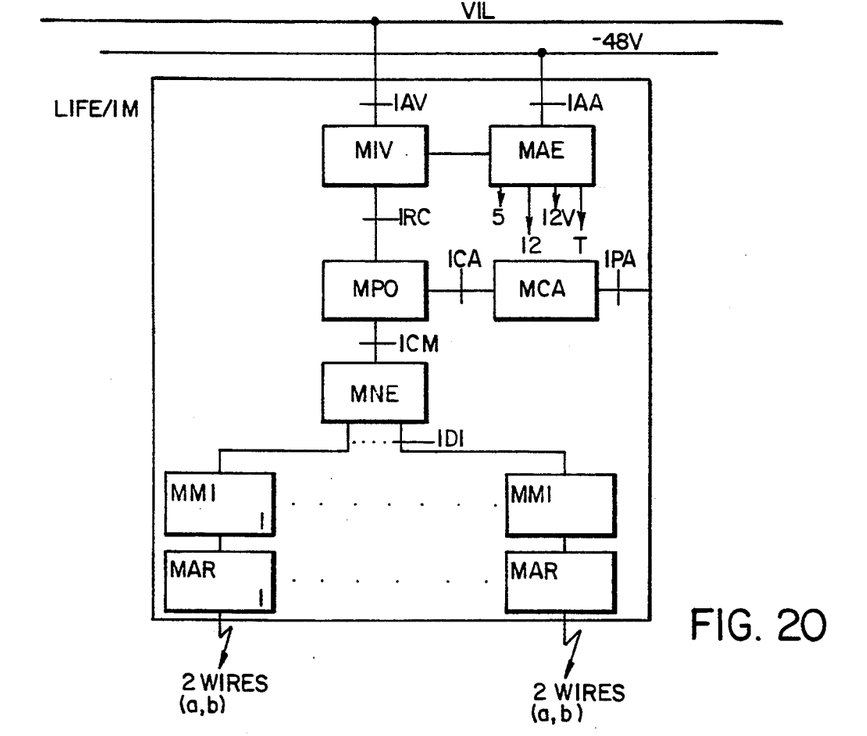
FIG. 20 illustrates a line interface element-integrated module (LIFE/IM).

FIG. 20 illustrates a line interface element-integrated module (LIFE/IM).

More specifically, FIG. 14 represents the interconnection network element 14 in FIGS. 4, 5, 6, 7 and 8. FIGS. 13, 15, 16, 17, 18, 19 and 20 represent different types of the block number 13 in FIGS. 4, 6, 7 and 8. The number of each of these types of blocks that make up the block 10 in FIG. 6 depend on the functions to be performed by block 10

The abbreviations in FIGS. 12–20 represent the following:

| Abbreviation | Element |
| --- | --- |
| MAA | Rack Power Supply Module |
| MAE | Element Power Supply Module |
| MAI | Interface Adaptor Module |
| MAR | RTC Access Module |
| MBC | Packet Switching Bus Module |
| MCA | Alarm Capture Module |
| MCD | Disk Controller Module |
| MCV | L I B (Local Interconnection Bus) Connection Module |
| MEV | LIB Extension Module |
| MMC | Switching Memory Module |
| MMI | Integrated Modem Module |
| MNE | Link Level Module |
| MPO | Processing Module |
| MRA | Alarm Collection Module |
| MRC | Network Connection Module |
| MTA | Alarm Transmission Module |
| VIL | Local Interconnection Bus |
| IAB | Rack Power Supply Interface |
| IAE | Element Power Supply Interface |
| IAV | LIB Access Interface |
| IBC | Switching Bus Interface |
| ICA | Alarm Capture Interface |
| ICE | Power up Control Interface |
| ICM | Communications Interface |
| ICN | Console Interface |
| IDI | Internal Data Interface |

| Abbreviation | Element |
| --- | --- |
| IDE | External Data Interface |
| IER | Network Elements Interface |
| IEV | LIB Extension Interface |
| IPA | Alarm Propagation Interface |
| IRA | Alarm Collection Interface |
| IRC | Interconnection Network Interface |
| ITA | Alarm Transmission Interface |
| TCP/IP | Transmission Control Protocol/Internet Protocol |

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A telecommunications packet switching system for use with a network, the system comprising:
   a) network station means for carrying out packet switching and for connecting to the network, the network station including:
      1) a plurality of network station elements connected to each other in a flat array configuration, each of the network station elements including connections to at least one processing unit through a local interconnecting route, each of the processing units including a plurality of line interface elements, the local interconnecting route including:
         i) means for providing communication among a set of the line interface elements included within each of the processing units; and
         ii) means for providing communication to line interface elements of other processing units;
   b) control station means, connected to the network station means, for operating and administering the telecommunications packet switching system;
   c) a plurality of management terminal means, connected to the control station means, for operating the telecommunications packet switching system; and
   d) software being distributed throughout the telecommunications packet switching system.

2. The system of claim 1, wherein:
   a) the processing units may be one of three types of processing units:
      1) a first type of processing unit, each of which exclusively constitutes means for switching packets;
      2) a second type of processing unit, each of which exclusively constitutes means for controlling and supervising the telecommunications packet switching system; and/or
      3) a third type of processing unit, each of which constitutes both:
         (i) means for switching packets; and
         (ii) means for controlling and supervising the telecommunications packet switching system; and
   b) the local interconnecting route includes:
      1) first channel means for distributing a clock signal;

2) second channel means for transmitting data from the line interface elements of the processing units to the connecting network; and
3) third channel means for transmitting data from the connection network toward the line interface elements of the processing units.

3. The system of claim 1, wherein:

the line interface elements include a plurality of integrated modem means for connecting the system with different network types including switched telephone networks, high speed networks, packet switching networks and direct connection to subscribers; and the system includes a structure having physical and logical connection means for incorporating additional modems and additional communication protocols.

4. The system of claim 1, wherein:

each line interface element includes (1) its own line interface element processor and (2) a DC/DC converter, so that there are no critical elements in the connection network or electrical power distribution system, so that electrical power and processing functions of each line interface element are independent of the electric power and processing functions of other line interface elements; and the system has a hardware structure which embodies a fault tolerant strategy and which supports the software.

5. The system of claim 1, wherein:

a) the software includes:
1) own operating system basic software means for providing a virtual machine environment;
2) application software means for implementing system functions, designed around a functional unit concept that includes:
   i) a basic service module, which includes a number of services and facilities common to each unit; and
   ii) a functional kernel which is different for each unit and which provides specific functionality; and
3) system management software means for supervising and managing the system and network;

b) the software is executed by each line interface element, processing a copy of the operating system and application software inside.

* * * * *